United States Patent
Katzung et al.

(10) Patent No.: US 8,738,864 B2
(45) Date of Patent: May 27, 2014

(54) AUTOMATED DATA INTERFACE GENERATION

(75) Inventors: Alexander Katzung, Wiesbaden (DE); Christian Gaertner, Oestringen (DE)

(73) Assignee: SAP AG, Walldorf (DE)

( * ) Notice: Subject to any disclaimer, the term of this patent is extended or adjusted under 35 U.S.C. 154(b) by 195 days.

(21) Appl. No.: 13/416,415

(22) Filed: Mar. 9, 2012

(65) Prior Publication Data

US 2013/0238864 A1 Sep. 12, 2013

(51) Int. Cl.
*G06F 12/00* (2006.01)

(52) U.S. Cl.
USPC ............................ 711/154; 711/156; 711/170

(58) Field of Classification Search
None
See application file for complete search history.

(56) References Cited

U.S. PATENT DOCUMENTS

2003/0135827 A1 7/2003 Kanzler et al.
2005/0120051 A1* 6/2005 Danner et al. ............. 707/104.1

OTHER PUBLICATIONS

European Application Serial No. 13000898.0, Extended European Search Report mailed Aug. 6, 2013, 80 pgs.
"Oracle Warehouse Builder: A Technical Overview", An Oracle Technical White Paper, (Feb. 2000), 21 pgs.

* cited by examiner

*Primary Examiner* — Shawn X Gu
(74) *Attorney, Agent, or Firm* — Schwegman, Lundberg & Woessner, P.A.

(57) ABSTRACT

Various embodiments herein include at least one of systems, methods, and software for automated data interface generation to facilitate data reporting and analysis performance against data in a transaction data environment from another computing environment. One such embodiment includes receiving input identifying at least a first computing environment and a generate action input. Such embodiments further include, in response to receiving the input, automatically identifying data of the portion of the first computing environment to be accessed by the processes of a second computing environment. Based on the identified data, some embodiments may then generate and store a dataset that maps between at least some data elements of the second computing environment and at least some respective data elements in the first computing environment. These and other embodiments are illustrated and described herein.

19 Claims, 6 Drawing Sheets

AUTOMATED DATA INTERFACE GENERATION

BACKGROUND INFORMATION

Data warehousing is often used for reporting and analysis within organizations. Within data warehousing, reporting and analysis tools exist that operate against organization data copied from a transaction data environment into a data warehouse, which is a separate instance of organization data, which is essentially out of date once it is copied. Therefore, the reporting and analysis performed against a data warehouse instance can only be considered historic and is certainly not real time. Further, the copying of data from the transaction data environment to the data warehouse is a time consuming and computing-resource intensive process.

More recent data warehousing solutions allow for conventional data warehousing reporting and analysis to be performed directly against data in the transaction environment. Such solutions may rely on interfaces that map between data elements needed by data warehouse reporting and analysis tools and data elements in a transaction data environment. To date, these mappings have been custom developed by advanced users having knowledge of data warehouse reporting and analysis tools and their data requirements and data in the transactional data environment.

DETAILED DESCRIPTION

Figure 1:
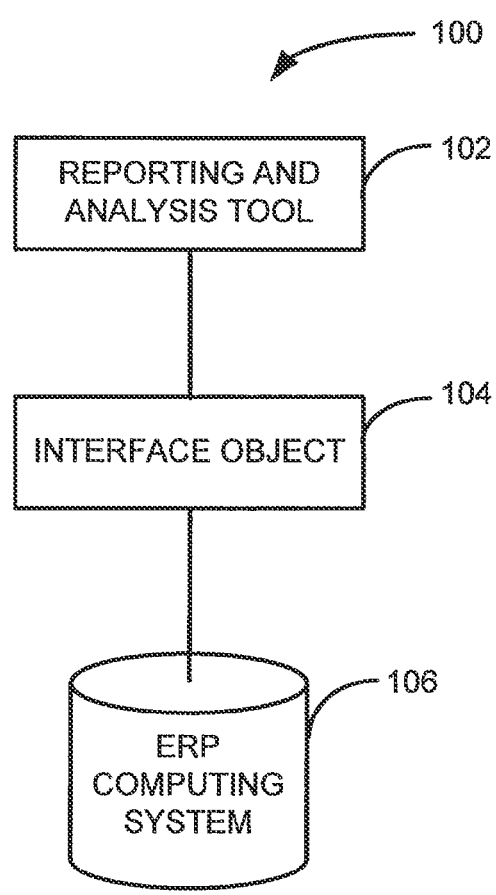
FIG. 1 is a logical block diagram of a system, according to an example embodiment.

Embodiments as illustrated and described herein include mechanisms to remove the need for users having advanced knowledge of underlying data requirements of reporting and analysis tools, as may exist in a data warehousing or other reporting and analysis contexts, and how data exists in a transactional data environment by providing mechanisms for automated data interface generation. Such data interfaces may be generated through use of a generation tool as described with regard to the several embodiments herein. A data interface, once generated, allows for data reporting and analysis tools to execute against data in a transaction data environment to provide timely reports and analysis without the additional overhead that is typically involved with data warehousing. Thus, the data interfaces generated through utilization of the automated data interface generation tool provides for considerable efficiencies over pure data warehousing solutions and previous data interface solutions that required advanced user knowledge to implement. These and other embodiments are illustrated and described herein.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, Application Specific Integrated Circuit (ASIC", microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a logical block diagram of a system 100, according to an example embodiment. The system 100 includes at least one reporting and analysis tool, an interface object 104, and a transactional data processing environment, such as an Enterprise Resource Planning (ERP) system 106.

The reporting and analysis tool 102 is generally a tool that is utilized to perform at least one of a reporting and an analysis function against a dataset. The reporting and analysis tool 102 in some embodiments may be a tool that has typically been utilized to operate against data stored in a data warehouse that was copied from a transaction data environment, such as the ERP system 106. The reporting and analysis tool 102 may perform one or more functions, such as month end reporting, profitability analysis, generation of financial statements or other financial reporting, inventory analysis, and other reporting and analysis functions depending on the particular reporting and analysis tool 102. As the illustrated reporting and analysis tool 102 is intended to represent at least one such tool, there may be a plurality of reporting and analysis tools 102 in various embodiments. Thus, the reporting and analysis tool 102 may be a tool included with or provided by a developer of the ERP computing system 106 or a tool developed and provided by one or more third parties.

As stated above, the at least one reporting and analysis tool 102 is a tool that has typically been utilized to operate against data stored in a data warehouse. However, in the system 100 the reporting and analysis tool 102 operates against data stored in or otherwise maintained by the ERP computing system 106. The ERP computing system 106 is an active, dynamic, and production transaction data environment. Through performance of the functions of the at least one reporting and analysis tool 102 against data of the ERP computing system 106, the functions provide more timely reporting and analysis output than possible through performance of such functions against data stored in a data warehouse. Further, efficiencies are gained by reducing data storage requirements, removing the need for lengthy data copying processes to populate data warehouse instances, eliminating support resources for maintenance of a data warehouse, among others.

However, to allow the at least one reporting and analysis tool 102 to perform such functions against the transaction data environment as provided by the ERP computing system 106, the at least one reporting and analysis tool 102 utilizes at least one interface object 104. An interface object 104 provides a map of data items expected in the reporting and analysis tool 102 to data items as maintained or provided in the transaction data environment of the ERP computing system 106. As there can be multiple reporting and analysis tools 102, there may also be multiple corresponding interface objects 104. In some embodiments, different reporting and analysis tools 102 may share one or more interface objects 104, but in other embodiments, each reporting and analysis tool 102 may have its own interface object 104.

An interface object 104, as stated above provides a map of data items expected in the reporting and analysis tool 102 to data items as maintained or provided in the transaction data environment of the ERP computing system 106. In some embodiments, an interface object 104 may be a metadata representation that includes fields of one or more reporting and analysis tools 102 in relation, or mapped, to respective fields, objects, or services within a transaction data environment, such as the ERP computing system 106. In other embodiments, the interface object 104 may include services that may be called by one or more reporting and analysis tools to obtain data from a transaction data environment, such as the ERP computing system 106. In one such embodiment, a service call by a particular reporting and analysis tool may be for a particular data item as identified in an argument or the service call may be for a specific service of the interface object 104. The interface object 104 may then determine based on the argument or the called service which data to obtain based on a stored mapping included in or retrieved by the interface object 104.

Interface objects 104 may be stored or otherwise located in various locations, depending on the particular embodiment. For example, in various embodiments, an interface object 104 may be accessible on or retrieved from a server computing device, such as a file server, a database server via a database management system, a file local to a computing device upon which the reporting and analysis tool 102 executes, and other locations. In a further embodiment, an interface object 104 may be located and accessed within a transaction data environment, such as the ERP computing system 106. Thus, the one or more interface objects 104, that may be included in a particular embodiment, may be stored in and accessed from virtually any location that a reporting and analysis tool 102 can access.

In some embodiments of the system 100, at least one of the at least one reporting and analysis tool 102 and the ERP computing system 106 provides a user interface through which an interface object 104 can be automatically generated. In some such embodiments, the user interface provides options for user input to specify parameters upon which the interface object 104 will be generated. Such parameters typically include identification of the transaction data environment, such as the ERP computing system 106, and the data reporting and analysis tool 102 that are to be bridged by the interface object 104 to be automatically generated. Such parameters in some embodiments may be expressly input. The parameters in some embodiments may also, or alternatively, be assumed or preprogrammed based on different factors such as the ERP computing system 106 or reporting and analysis tool 102 providing the user interface, configuration settings of either the ERP computing system 106 and reporting and analysis tool 102, permissions of a user utilizing the user interface, and the like. Examples of parameters that may be provided as input or may be otherwise assumed or inferred may include a particular business segment or set of business segments of interest, a parameter specifying a period for which the resulting interface object 104 is to be persisted (single use, one month, one year, permanent, etc.), language options, and users or processes authorized to utilize the resulting interface object 104, among others.

The user interface of such embodiments may also include an action button or other input mechanisms to receive input to cause an interface object generation tool to generate the desired interface object 104. The interface object generation tool, as described further below, is a process that executes to automatically generate the desired interface object 104 based on the input received via the user interface. The interface object generation tool may further rely upon metadata that describes a reporting structure of the target transaction data environment, such as the ERP computing system 106. The metadata describing the reporting structure of the target transaction data environment provides information on what data is available, where it is stored or how it may be accessed in the transaction data environment, and characteristics of the data items, such as data types, field lengths, constraints, related data items, services through which to access or update particular data items, and other such data. The interface object generation tool may further rely upon metadata descriptive of data items expected, needed, or otherwise desired for operation of the reporting and analysis tool 102. The interface object generation tool then operates on the metadata to match data from the transaction data environment, such as the ERP computing system 106, to data of the reporting and analysis tool 102. The desired interface object 104 is then generated to map data items between the reporting and analysis tool 102 and the transaction data environment based on the matching of data. The generated interface object 104 is then stored in a location where it may accessed and utilized according to the particular embodiment as discussed above.

Figure 2:
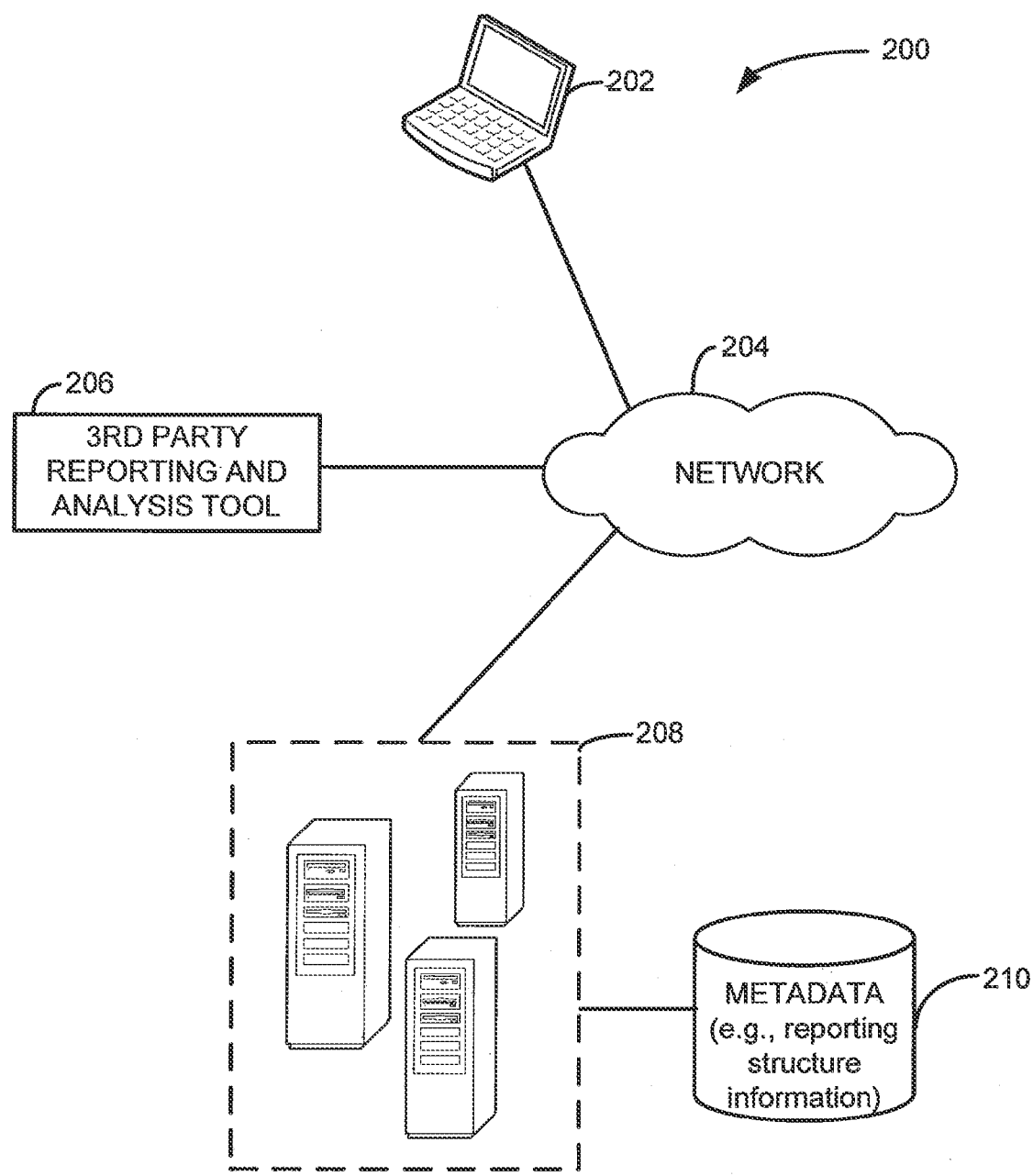
FIG. 2 is a logical block diagram of a networked system, according to an example embodiment.

FIG. 2 is a logical block diagram of a networked system 200, according to an example embodiment. The networked system 200 includes a client computing device 202 connected to a network 204, such as one or more of a local area network, a wide area network, a virtual private network, a valued added network, a system area network, and the Internet. Also connected to the network 204 are a transaction data environment 208, such as an ERP computing system 102 of FIG. 1, and a third party reporting and analysis tool 206.

Although only a single client computing device 202 is illustrated, multiple such client computing devices may be included in various embodiments. Similarly, although on a single transaction data environment 208 is illustrated, some embodiments may include multiple transaction data environments or the single transaction data environment 208 distributed across multiple network 204 locations.

The client computing device 202 may include a reporting and analysis tool that utilizes an interface object, such as interface object 104 as discussed with regard to FIG. 1, to access data within the transaction data environment 208. However, in some embodiments, the client computing device 202 interacts, via a web browser or thin-client application, with a reporting and analysis tool hosted at a network 204.

The network location may be the third party reporting and analysis tool 206, a web-based application provided by a computing system that operates within or otherwise accesses the transaction data environment 208, or another network 204 location.

In some embodiments, the transaction data environment 208 includes metadata 210 descriptive of data available within the transaction data environment 208. This metadata 210 may be utilized by an interface object generation tool, as described above, to generate interface objects to allow one or more reporting and analysis tools to access data directly within the transaction data environment 208. The interface object generation tool may be present and execute on the client computing device 202, one or more computing devices of the third party reporting and analysis tool 206, on one or more computing devices of the transaction data environment 208, or other computing device connected to the network 204.

Figure 3:
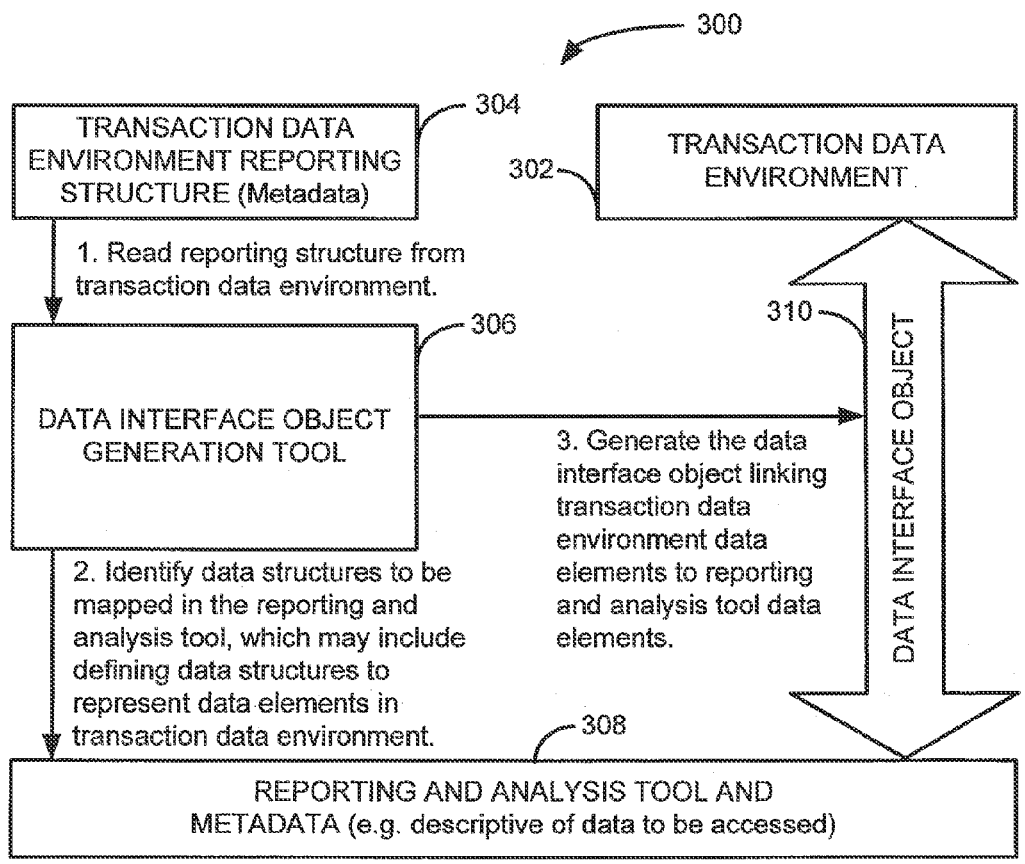
FIG. 3 is a logical block diagram of a system, according to an example embodiment.

FIG. 3 is a logical block diagram of a system 300, according to an example embodiment. The system 300 illustrated is a logical presentation of how the interface object generation tool described above operates according to some embodiments. The system 300 includes a transaction data environment 302 that includes data elements such as data, data objects, services through which data is accessed, database tables, and the like. Such data elements may contain transaction data, master data, configuration settings, metadata, and other data types against which a reporting or analysis tool may obtain data through a data interface object. The system 300 further includes data 304, such as metadata, defining or descriptive of the transaction data environment, such as a reporting structure that may be utilized to obtain data for various purposes. The system 300 also includes a reporting and analysis tool 308 and metadata descriptive of data for operation of a reporting and analysis tool 308.

Additionally, the system 300 includes a data interface object generation tool 306 that operates to generate a data interface object 310 to allow the reporting and analysis tool 308 to access data within the transaction data environment 302. The data interface object generation tool 306 operates, upon receipt of a generate command, to read the data 304 descriptive of the transaction data environment reporting structure. The data interface object generation tool 306 further operates to identify data structures to be mapped in the reporting and analysis tool 308, such as by reading the metadata descriptive of data for operation of a reporting and analysis tool 308. The data interface object generation tool 306 next operates to match the data elements as defined in the metadata descriptive of data for operation of a reporting and analysis tool 308 with respective data identified as available in the transaction data environment by the data 304 descriptive of the transaction data environment reporting structure. The matching may be performed based on one or more of expected field names, field characteristics (e.g., data type, field length, etc.), similarity scoring algorithms, and other matching methods. Next, the data interface object generation tool 306 generates the data interface object 310 linking transaction data environment data elements to reporting and analysis tool data elements. Once generated, and as discussed above with regard to the interface object 104 of FIG. 1, the data interface object 310 provides a map of data items expected in the reporting and analysis tool 308 to data items as maintained or provided in the transaction data environment 302.

Figure 4:
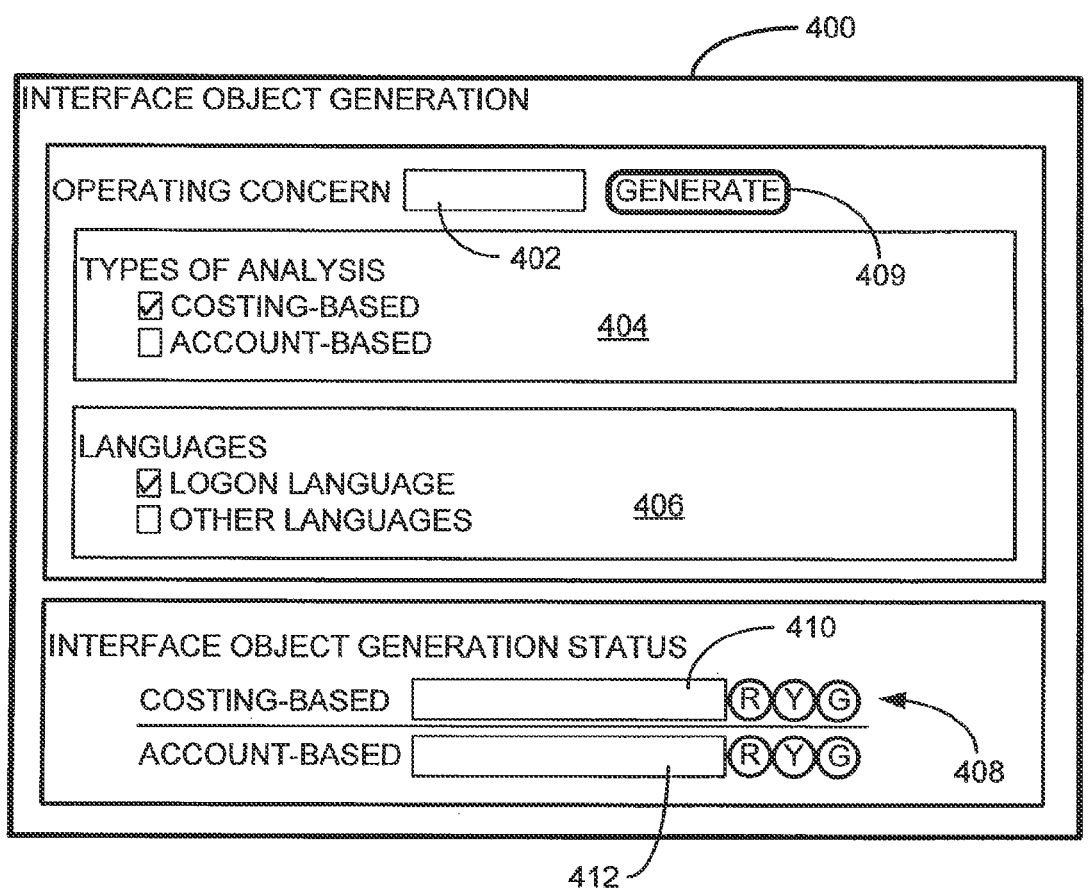
FIG. 4 is a user interface illustration, according to an example embodiment.

FIG. 4 is a user interface 400 illustration, according to an example embodiment. The user interface 400 is an example of a user interface that may be utilized to trigger the automatic generation of a data interface object 310 of FIG. 3 or an interface object 104 of FIG. 1. The user interface 400 is one example embodiment of a user interface that maybe utilized to generate a data interface object. The user interface 400 in may appear differently, include different input elements, more or less input elements, or no input elements in various embodiments.

As illustrated in the example embodiment, user interface 400 includes a first field 402 within which an operating concern can be specified. The operating concern may be a business segment, department, subsidiary, a class of products, a specific product, or another operating concern within an organization. Different input factors may be requested in a factor portion 404 of the user interface 400 as well as different options in an option portion 406. Once the data interface object is generated, an identifier of the generated data interface provider may be provided in one or more address fields 410 and 412. A status indictor 408 may be provided with regard to a data interface object to be generated. The status indicator 408 as illustrated includes three statuses, which may be color-coded. Red indicates the data interface object has not been generated, yellow that the generation is in progress, and green indicating that the generation has been complete.

Once the various input elements, if any, have been populated within the user interface 400, a generate action button 409 or other input mechanism may be utilized to trigger the automated data interface object generation. At that point, the status indictor 408 may switch from red to yellow and then to green when the generation has completed. However, in some embodiments, an application providing the user interface 400 may also include a process that reads a log file or other data structure to determine if a data interface object as specified through the various input fields already exists. When the process determines that such a data interface object already exists, the process may cause the status indictor 408 to be green, indicating the presence of the data interface object. This, in some embodiments, may also cause the generate action button 409 or other input mechanism to be disabled to prevent regeneration of the already existing data interface object.

Figure 5:
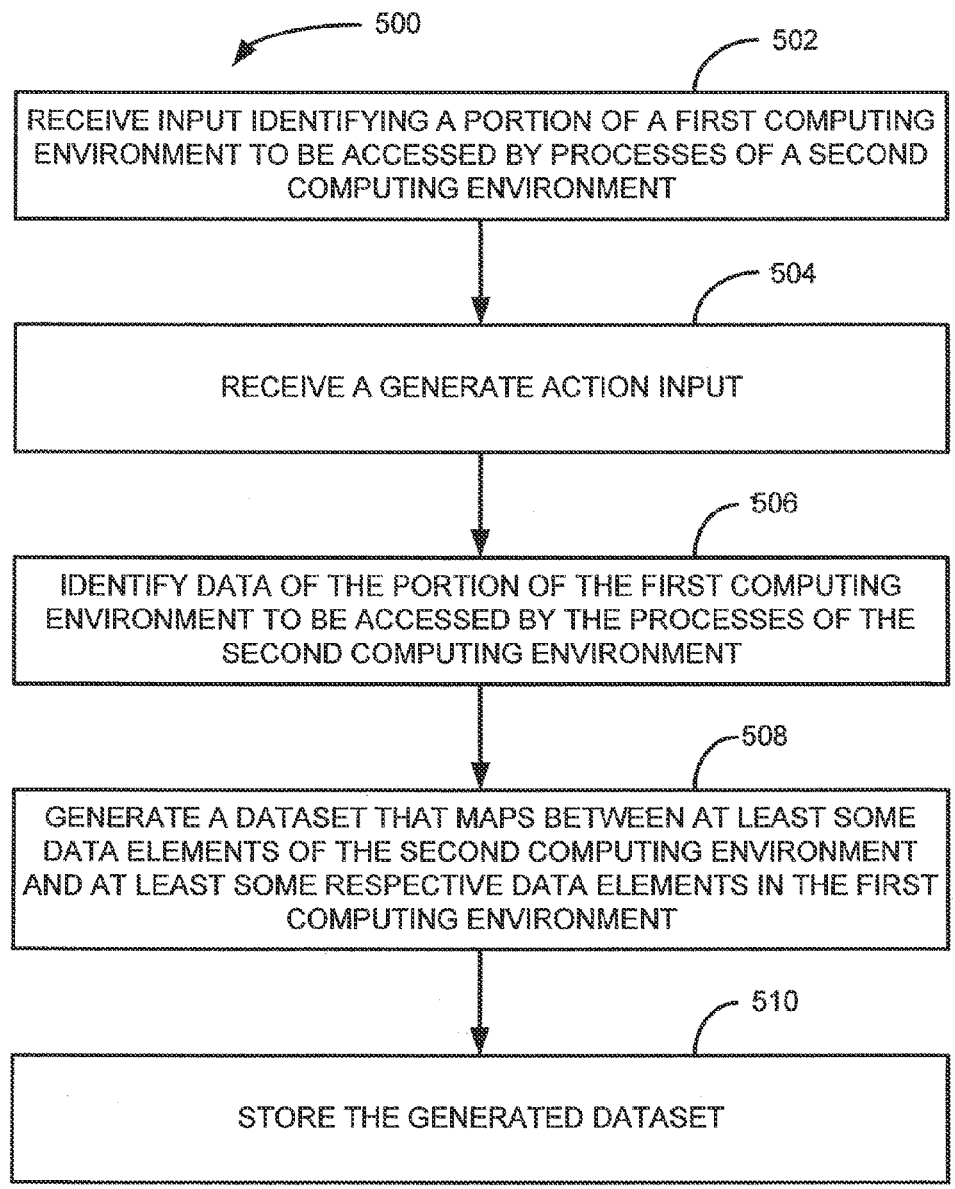
FIG. 5 is a block flow diagram of a method, according to an example embodiment.

FIG. 5 is a block flow diagram of a method 500, according to an example embodiment. The method 500 is an example of a method performed to automatically generate of a data interface object in response to received input. The example method 500 includes receiving 502 input identifying a portion of a first computing environment to be accessed by processes of a second computing environment. The first computing environment may be a transaction data environment of a computing application, such as an ERP application or other application. The portion of the first computing environment may be an entirety of the first computing environment or a smarter portion, such as a portion associated with a business segment. The second computing environment may be a reporting and analysis tool. In some embodiments, the second computing environment within which a reporting and analysis tool operates is the same computing environment as the first computing environment.

The method 500 further includes receiving 504 a generate action input. In response to the received 504 generate action input and based on the identified portion of the first computing environment, the method 500 proceeds to automatically generate a data interface object, which may include a data set to be utilized by at least one process that executed in the second computing environment to access data of the first computing environment.

The automatic generation of the method 500 includes identifying 506 data of the portion of the first computing environment to be accessed by the processes of the second computing environment. The method next generates 508 a dataset that maps between at least some data elements of the second computing environment and at least some respective data elements in the first computing environment. Finally, the method 500 stores 510 the generated dataset on a data storage device accessible from the second computing environment.

The method 500, in some embodiments, prior to receiving 504 the generate action input, includes receiving input representative of a configuration of the first computing environment, such as input that identifies a type of accounting implemented in the first computing environment (e.g., cost-based or account-based, and cash-based or accrual-based). In such embodiments, the identifying 506 data of the portion of the first computing environment to be accessed by the processes of the second computing environment is performed may then be based in part on the input representative of the configuration of the first computing environment.

In some further embodiments of the method 500, identifying 506 data of the portion of the first computing environment includes reading metadata descriptive of a plurality data elements associated with the portion of the first computing environment. Subsequently in such embodiments, the generating 508 of the dataset may include identifying data structures needed in the second computing environment to represent the identified data of the portion of the first computing environment based on the read metadata. These embodiments of the method 500 additionally include adding, to the generated 508 dataset, data defining the identified data structures with mappings to respective identified data of the portion of the first computing environment.

In these and other embodiments of the method 500, a log may be maintained of the data interface objects that are generated. For example, some embodiments include writing data to a log indicating the dataset has been generated 508 and stored 510 to allow processes that execute in the second computing environment to access data of the first computing environment. Also, in some embodiments, prior to performing the identifying 506, generating 508, and storing 510, the method 500 may read the log to determine whether the dataset has been generated to allow processes that execute in the second computing environment to access data of the first computing environment. When the dataset has been generated, the identifying 506, generating 508, and storing 510 are prevented from being performed.

Figure 6:
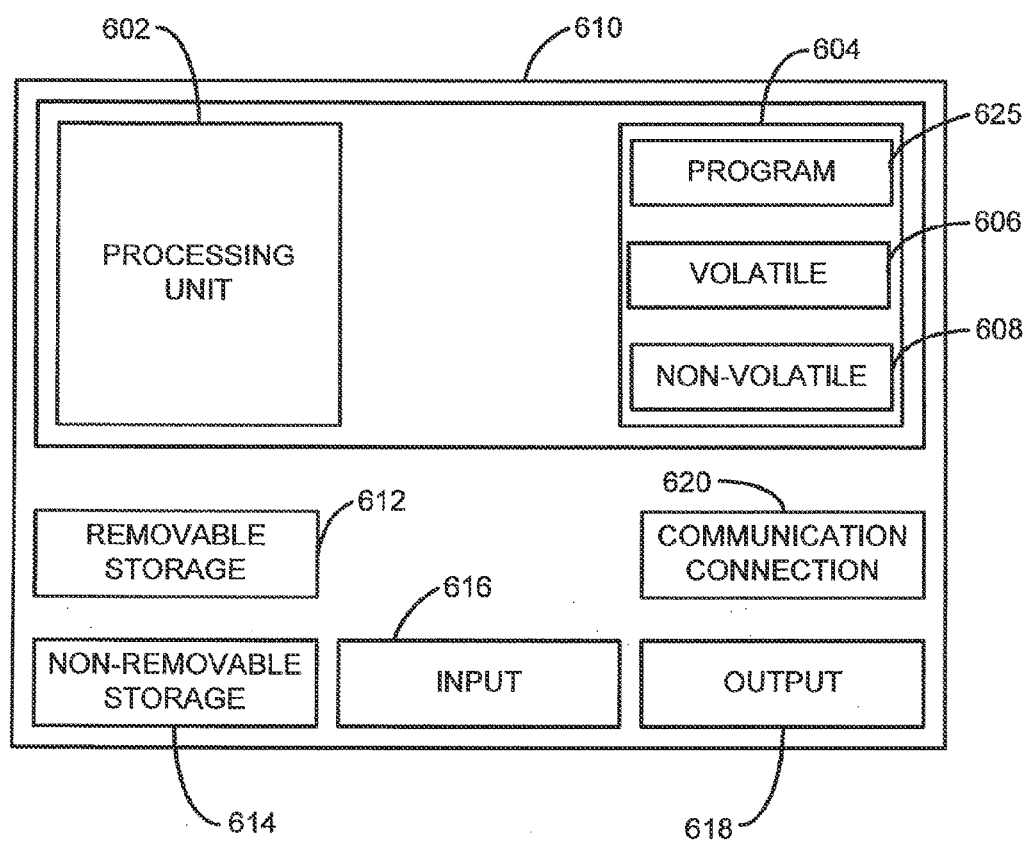
FIG. 6 is a block diagram of a computing device, according to an example embodiment.

FIG. 6 is a block diagram of a computing device, according to an example embodiment. In one embodiment, multiple such computer systems are utilized in a distributed network to implement multiple components in a transaction based environment. An object-oriented, service-oriented, or other architecture may be used to implement such functions and communicate between the multiple systems and components. One example computing device in the form of a computer 610, may include at least one processing unit 602 that includes at least one processing core, at least one memory 604, at least one removable storage 612, and optionally at least one non-removable storage 614. Memory 604 may include volatile memory 606 and non-volatile memory 608. Computer 610 may include—or have access to a computing environment that includes a variety of computer-readable media, such as volatile memory 606 and non-volatile memory 608, removable storage 612 and non-removable storage 614. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 610 may include or have access to a computing environment that includes input 616, output 618, and a communication connection 620. The computer may operate in a networked environment using at least one communication connection, via at least one network interface device of the computer 610, to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the at least on processing unit 602 of the computer 610. A hard drive, CD-ROM, and RAM are some examples of articles including a computer-readable medium. For example, a computer program 625 capable of performing at least one of the methods and processes illustrated and described herein.

As another example, a computer-readable storage medium having instructions stored thereon that are executable by at least one computer processor to cause a computing device to perform a set of actions to automatically generate a data interface object. Such actions may be triggered by receipt of a command to generate a data interface object to provide a data interface between a first computing environment and a second computing environment. The generate command may include data identifying at least one portion of the first computing environment to be accessed by processes of the second computing environment. In response to receiving the generate command and based on the data identifying the at least one portion of the first computing environment, the instructions may be executed to automatically identify data of the at least one portion of the first computing environment to be accessed by the processes of the second computing environment. The instructions may be further executed to generate and store a dataset that maps between at least some data elements of the second computing environment and respective data elements in the first computing environment.

A further embodiment of the present subject matter may take the form of a system, such as a computing device. Such a system typically includes at least one computer processor, at least one memory device, and at least one network interface device. Instructions are stored on the at least one memory device and are executable by the at least one computer processor to cause the system to perform actions to generate a data interface object. Performance of the action is trigger by reception, from a requestor via the at least one network interface device, of a command to generate a data interface object. The data interface object to be generated will provide a data interface between a first computing environment and a second computing environment. The generate command may be received with data identifying the first computing environment to be accessed by at least one process of the second computing environment. In response to receiving the generate command, and based on the data identifying the first computing environment to be accessed by the at least one process of the second computing environment if received, the instructions are executable to automatically identify data of the first computing environment to be accessed by the second computing environment and to generate a dataset that maps between at least one data element of the second computing environment and a respective data element of the first computing environment. The dataset may then be stored the generated dataset as at least a portion of the data interface object.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A non-transitory computer-readable storage medium, with instructions stored thereon, which when executed by at least one processor of a computing device causes the computing device to:
   receive a command to generate an interface object to provide a data interface between first computing environment and a second computing environment, the generate command including data identifying at least one portion of the first computing environment to be accessed by processes of the second computing environment;
   in response to receiving the generate command and based on the data identifying the at least one portion of the first computing environment, automatically:
      identify data of the at least one portion of the first computing environment to be accessed by the processes of the second computing environment;
      generate a dataset that maps between at least some data elements of the second computing environment and respective data elements in the first computing environment; and
      store the generated dataset as the interface object.

2. The non-transitory computer-readable storage medium of claim 1, wherein the first computing environment includes a transaction data environment of a computing system.

3. The non-transitory computer-readable storage medium of claim 1, wherein the at least one portion of the first computing environment is at least one portion of a system associated with a business segment for which data processing in the second computing environment is to be performed.

4. The non-transitory computer-readable storage medium of claim 1, wherein:
   the generate command further includes data representative of a configuration of the first computing environment; and
   identifying data of the at least one portion of the first computing environment to be accessed by the processes of the second computing environment is performed based in part on the data representative of the configuration of the first computing environment.

5. The non-transitory computer-readable storage medium of claim 1, wherein:
   identifying data of the at least one portion of the first computing environment includes reading metadata descriptive of a plurality data elements associated with the at least one portion of the first computing environment; and
   generating the dataset that maps between the at least some data elements of the second computing environment to the respective data elements in the first computing environment includes:
      identifying data structures needed in the second computing environment to represent the identified data of the at least one portion of the first computing environment based on the read metadata; and
      adding, to the generated dataset, data defining the identified data structures with mappings to respective identified data of the at least one portion of the first computing environment.

6. The non-transitory computer-readable medium of claim 1, further comprising:
   upon storing the generated dataset as the interface object, writing data to a log indicating the interface object has been generated to allow processes that execute in the second computing environment to access data of the first computing environment.

7. The non-transitory computer-readable storage medium of claim 6, further comprising:
   prior to performing the identifying, generating, and storing, reading the log to determine whether the interface object has been generated to allow processes that execute in the second computing environment to access data of the first computing environment; and
   when the interface object has been generated, preventing the identifying, generating, and storing.

8. A system comprising:
   at least one computer processor, at least one memory device, and at least one network interface device; and
   instructions stored on the at least one memory device and executable by the at least one computer processor to:
      receive, from a requestor via the at least one network interface device, a command to generate an interface object to provide a data interface between a first computing environment and a second computing environment, the generate command including data identifying the first computing environment to be accessed by at least one process of the second computing environment; and
      in response to receiving the generate command and based on the data identifying the first computing environment to be accessed by the at least one process of the second computing environment, automatically:
         identify data of the first computing environment to be accessed by the second computing environment;
         generate a dataset that maps between at least one data element of the second computing environment and a respective data element of the first computing environment; and
         store the generated dataset as at least a portion of the interface object.

9. The system of claim 8, wherein:
   identifying data of the first computing environment includes reading metadata descriptive of a plurality data elements associated with the first computing environment, the reading of metadata including retrieving, via the at least one network interface device, metadata from a database; and
   generating the dataset that maps between the at least one data element of the second computing environment and a respective data element of the first computing environment includes:
      identifying at least one data structure needed in the second computing environment to represent the identified data of the portion of the first computing environment based on read metadata; and
      adding, to the generated dataset, data defining the identified at least one data structure with at least one mapping to a respective identified data element of the first computing environment.

10. The system of claim 8, wherein the first computing environment is data environment of at least a portion of an Enterprise Resource Planning (ERP) computing application.

11. The system of claim 8, wherein:
   the generate command further includes data representative of a configuration of the first computing environment; and identifying data of the first computing environment to be accessed by the at least one process of the second computing environment is performed based in part on the data representative of the configuration of the first computing environment.

12. The system of claim 8, further comprising:
upon storing the generated dataset as the interface object, writing data to a log indicating the interface object has been generated; and
upon receipt of a subsequent generate command and prior to performing the identifying, generating, and storing, reading the log to determine whether the interface object to be generated, in response to the subsequent generation command, has previously been generated; and
when such an interlace object has been previously generated, preventing the identifying, generating, and storing.

13. A method comprising:
receiving a command to generate an interface object to provide a data interface between a first computing environment and a second computing environment, the generate command including data identifying at least one portion of the first computing environment to be accessed by processes of the second computing environment;
in response to receiving the generate command and based on the data identifying the at least one portion of the first computing environment, automatically:
 identifying data of the at least one portion of the first computing environment to be accessed by the processes of the second computing environment;
 generating a dataset that maps between at least some data elements of the second computing environment and respective data elements in the first computing environment; and
 Storing the generated dataset as the interface object.

14. The method of claim 13, wherein the first computing environment includes a transaction data environment of a computing system.

15. The method of claim 13, wherein the at least one portion of the first computing environment is at least one portion of a system associated with a business segment for which data processing in the second computing environment is to be performed.

16. The method of claim 13, wherein:
the generate command further includes data representative of a configuration of the first computing environment; and
identifying data of the at least one portion of the first computing environment to be accessed by the processes of the second computing environment is performed based in part on the data representative of the configuration of the first computing environment.

17. The method of claim 13, wherein:
identifying data of the at least one portion of the first computing environment includes reading metadata descriptive of a plurality data elements associated with the at least one portion of the first computing environment; and
generating the dataset that maps between the at least some data elements of the second computing environment to the respective data elements in the first computing environment includes:
 identifying data structures needed in the second computing environment to represent the identified data of the at least one portion of the first computing environment based on the read metadata; and
 adding, to the generated dataset, data defining the identified data structures with mappings to respective identified data of the at least one portion of the first computing environment.

18. The method of claim 13, further comprising:
upon storing the generated dataset as the interface object, writing data to a log indicating the interface object has been generated to allow processes that execute in the second computing environment to access data of the first computing environment.

19. The method of claim 18, further comprising:
prior to performing the identifying, generating, and storing, reading the log to determine whether the interface object has been generated to allow processes that execute in the second computing environment to access data of the first computing environment; and
when the interface object has been generated, preventing the identifying, generating, and storing.

* * * * *